(12) United States Patent
Goodwin

(10) Patent No.: US 10,599,487 B1
(45) Date of Patent: Mar. 24, 2020

(54) ADAPTABLE DATA SOURCE CONNECTION STRINGS

(71) Applicant: Noble Systems Corporation, Atlanta, GA (US)

(72) Inventor: Michael C. Goodwin, Edmond, OK (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 16/437,009

(22) Filed: Jun. 11, 2019

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
*G06F 16/22* (2019.01)

(52) U.S. Cl.
CPC .............. *G06F 9/541* (2013.01); *G06F 16/22* (2019.01)

(58) Field of Classification Search
CPC ....................................................... G06F 9/541
USPC ........................................................ 719/328
See application file for complete search history.

(56) References Cited

U.S. PATENT DOCUMENTS

| 6,286,047 B1 * | 9/2001 | Ramanathan ..... H04L 29/12066 370/229 |
| 6,615,231 B1 * | 9/2003 | Deen ...................... G06F 9/5055 709/200 |
| 7,558,799 B2 | 7/2009 | Battagin et al. |
| 10,120,913 B1 | 11/2018 | Mullins et al. |
| 2011/0113436 A1 * | 5/2011 | Pal ....................... G06F 11/2094 719/328 |

* cited by examiner

*Primary Examiner* — Timothy A Mudrick

(57) ABSTRACT

Various embodiments of the invention provide methods, systems, and computer-program products for converting a connection string configured to use a first API to connect to a data source of a data source type to using a second, different API to connect to the data source. The data source type is identified as being associated with the string and the string is parsed and stored in a key-value dictionary. An object is instantiated for a subclass designed for the data source type. This subclass inherits from a base class that includes an abstract version of a method defined for the second API and the subclass includes a non-abstract version of this method. A string is generated by calling the method associated with the object, causing the non-abstract version to be executed, which uses the dictionary to generate the string configured to use the second API to connect to the data source.

21 Claims, 10 Drawing Sheets

ADAPTABLE DATA SOURCE CONNECTION STRINGS

BACKGROUND

Many software applications require "connection strings" to communicate with various data sources. A connection string is a string that specifies information about a data source and the means of connecting to it. The string is typically passed in code to an underlying driver to initiate the connection. Although the data source is commonly a database, the data source could also be a different entity such as, for example, a spreadsheet or a text file.

Over time, a multitude of application programming interfaces ("APIs") have been developed to allow for accessing data from a variety of data sources and that use different styles of connection strings. For modern software applications, this has created a challenge in maintaining and migrating these applications from using legacy APIs, such as OLE DB and ODBC, to using more modern native APIs, such as ADO.NET. For example, in many instances, the only process available for maintaining and/or migrating a software application to support various APIs is by manually revising the configuration and/or settings of the application.

Thus, a need in the industry exists for producing data source connection strings capable of supporting legacy and/or modern connection types without requiring editing and/or modifying existing connection strings in an application. It is with respect to this and other considerations that the disclosure herein is presented.

BRIEF SUMMARY

In general, embodiments of the present invention provide computer-program products, methods, systems, apparatus, and computing entities for converting a first connection string configured to use a first application programming interface (API) to connect to a data source of a first data source type to a second connection string configured to use a second, different API to connect to the data source of the first data source type. In various embodiments, the first data source type is identified as associated with the first connection string and the connection string is parsed into connection information and stored in a key-value dictionary. Here, in particular embodiments, the connection information includes one or more attributes and corresponding values that are stored as key-value pairs in the key-value dictionary. Accordingly, in particular embodiments, the first data source type may be identified as associated with the first connection string by matching at least one of the one or more attributes with attributes registered with the first data source type that are used by the second, different API to connect to data sources of the first data source type.

Appropriately, an object is instantiated for a derived subclass designed for the first data source type in various embodiments based on the first data source type being identified as associated with the first connection string. Here, the derived subclass inherits from a base class that includes an abstract version of a method defined for the second, different API and the derived subclass includes a non-abstract version of this method. Therefore, a second connection string is generated by calling the method associated with the object, causing the non-abstract version of the method in the derived subclass to be executed. This version of the method is configured to use the connection information stored in the key-value dictionary to generate the second connection string configured to use the second, different API to connect to the data source of the first data source type. For instance, in particular embodiments, the non-abstract version of the method uses the connection information to generate the second connection string by (1) matching a key portion of a key-value pair stored in the key-value dictionary with an attribute registered by the first data source type and used by the second, different API to connect to data sources of the first data source type and (2) including the attribute registered by the first data source type along with the value portion of the key-value pair stored in the key-value dictionary in the second connection string.

Various embodiments of the invention may further generate connection strings configured to use other APIs. For instance, the base class may comprise an abstract version of a second method defined for a third API different from the first and second APIs and the derived subclass designed for the first data source type may comprise a non-abstract version of the second method. Here, a third connection string may be generated that is configured to use the third API to connect to the data source of the first data source type by calling the second method associated with the object. As a result of this call, the non-abstract version of the second method in the derived subclass is executed and this version of the second method is configured to use at least a portion of the connection information stored in the key-value dictionary to generate the third connection string configured to use the third API to connect to the data source of the first data source type.

In addition, various embodiments of the invention may also generate connection strings for other data sources. For instance, in particular embodiments, a corresponding value for a particular key-value pair identifying the data source may be set to a new data source of the first data source type. In this instance, a connection string may be generated by calling the method defined for the second, different API and associated with the second object and as a result, the non-abstract version of the method in the derived subclass is executed. Here, the non-abstract version of the method is configured to use at least a portion of the connection information stored in the key-value dictionary that includes the particular key-value pair with and the corresponding value set to the new data source to generate the connection string configured to use the second, different API to connect to the new data source of the first data source type.

Likewise, various embodiments of the invention may also generate connection strings with particular attributes associated with a particular data source type. For instance, in particular embodiments, the object for the derived subclass designed for the first data source type may be converted to a second object specific to the first data source type and a corresponding value may be set for a particular attribute registered by the first data source type and used by the second, different API to connect to data sources of the first data source type. In this instance, a connection string may be generated by calling the method associated with the second object, which results in the non-abstract version of the method in the derived subclass being executed. Here, this version of the method is configured to use at least a portion of the connection information stored in the key-value dictionary along with the particular attribute and corresponding value to generate a connection string that includes the particular attribute and corresponding value and is configured to use the second, different API to connect to the data source of the first data source type.

Furthermore, various embodiments of the invention may also generate connection strings to data sources of different data source types. For instance, in particular embodiments, a second object for a second derived subclass designed for a second data source type may be instantiated, in which the second derived subclass inherits from the base class and includes a second non-abstract version of the method defined for the second, different API. In this instance, a connection string is generated by calling the method associated with the second object. Here, the second non-abstract version of the method in the second derived subclass is executed and this version of the method is configured to use at least a portion of the connection information stored in the key-value dictionary to generate the third connection string configured to use the second, different API to connect to a data source of the second data source type.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
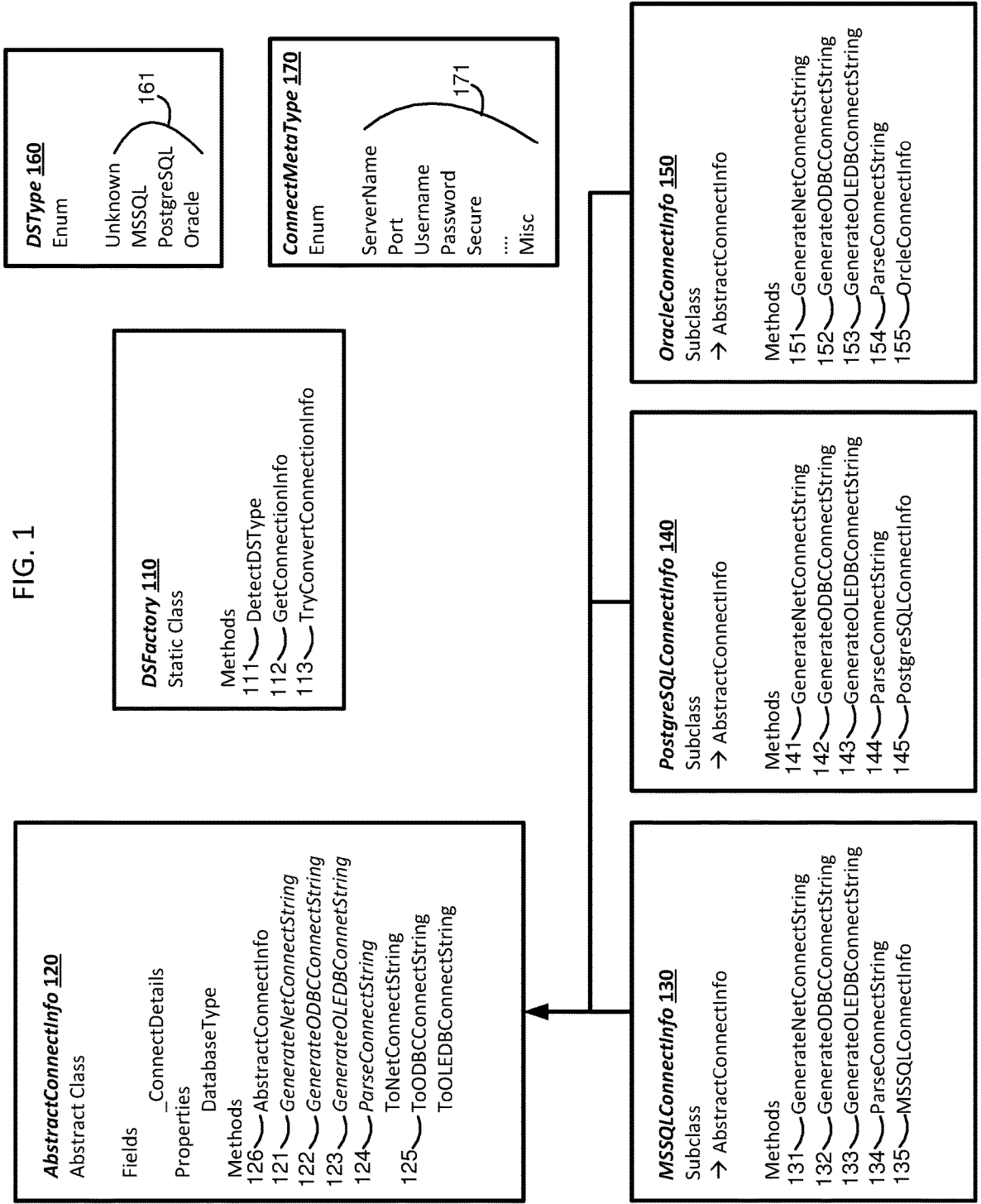
FIG. 1 illustrates a class framework detailing classes used in accordance with various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Class Framework

Various embodiments of the invention make use of object-oriented programming (OOP), which is a programming paradigm based on the concept of "objects" that contain data in the form of fields (often known as attributes) and code in the form of procedures (often known as methods). Accordingly, computer applications are designed in OPP by making them out of objects that interact with one another.

The most popular OOP languages are class-based, meaning objects are instances of classes. A class is an extensible-program-code-template for creating objects that provide initial values for state (member attributes) and implementation of behavior (member methods). Typically, the class name is used as the name for the class along with the name for the default constructor of the class, a subroutine for generating objects of the class, and as the type of objects generated by instantiating the class. When an object is created, the resulting object is called an instance of the class, and the member variables specific to the object are called instance variables. Accordingly, a computer application may create many instances of the same class as it runs that operate independently.

Several technical improvements are realized in various embodiments of the invention. Specially, these improvements allow for a consuming application to detect, convert, or utilize various data connection APIs for multiple data source types without requiring modification to a pre-existing connection string or knowledge of attribute and corresponding value requirements for the supported data source types Turning now to FIG. 1, a diagram of an object-oriented framework is shown that may be used in accordance with various embodiments of the invention. The particular configuration of the framework shown in FIG. 1 is but one such configuration that may be used to practice various aspects of the invention. However, other configurations of the framework may be used in other instances to practice these aspects. Therefore, the particular configuration of the framework shown in FIG. 1 should not be construed as limiting the scope of the invention.

The framework includes a static class named DSFactory 110. A static class is a type of class that cannot be instantiated. In other words, a program cannot use a new keyword to create a variable of the class type. In this particular embodiment, the DSFactory class 110 includes three methods, DetectDSType 111, GetConnectInfo 112, and TryConvertConnectionInfo 113. Accordingly, these methods 111, 112, 113 operate on input parameters and do not have to get or set any internal instance fields.

As is discussed further herein, the DetectDSType method 111 is used to identify the underlying data source type for a particular connection string. The GetConnectInfo method 112 is used to parse out the attributes and corresponding attribute values from a particular connection string. While the TryConvertConnectionInfo method 113 is used to convert connection information from a first data source type to a second data source type. Since the class 110 is static, the class name, itself, is used to access these three members of the class. For example, to access the method DetectDSType 111, a computer application would use DSFactory.DetectDSType.

Continuing on, the framework makes use of the template method pattern in various embodiments, which is a design pattern that defines the program skeleton of an algorithm in an operation, deferring some steps to subclasses. Such a pattern allows for the redesigning of certain steps of an algorithm without changing the algorithm's structure. The "template method" is generally implemented as a base class that contains shared logic of the overall algorithm that is invariant. The "template" ensures the overarching algorithm is always followed.

The second part of this pattern is concrete implementations of the base class know as derived subclasses that fill in the variant logic of the "template" with specific algorithms that vary from implementation to implementation. At runtime, a concrete subclass is instantiated. A method inherited from the base class is called, which then may call other methods defined by both the base class and subclass. This ensures the overall algorithm is performed in the same steps every time. However, some of the steps depend on which of the subclasses was instantiated.

Therefore, looking at the framework in FIG. 1, the abstract class AbstractConnectInfo 120 serves as the base class and the derived subclasses MSSQLConnectInfo 130, PostgreSQLConnectInfo 140, and OracleConnectInfo 150 serve as the concrete implementations for each supported data source type that extend from the AbstractConnectInfo class 120. An abstract class contains abstract methods that have a signature definition but no implementation. An abstract class cannot be instantiated. Instead a derived subclass that directly inherits from the abstract class is instantiated to implement the abstract methods, resulting in the methods being overridden with the derived subclass's versions of the methods.

Here, the AbstractConnectInfo class 120 has four abstract methods. The GenerateNetConnectString method 121, GenerateODBCConnectString method 122, and GenerateOLEDBConnectString, method 123 are used to generate data source connection strings for different APIs. While the ParseConnectString method 124 is used to parse a connection string associated with a particular data source type and store the connection information found in the string (e.g., the attributes and corresponding values) in a key-value dictionary for the data source type. The AbstractConnectInfo class 120 provides storage for this dictionary, which can be used in generating connection strings for the data source type utilizing different APIs, as well as connection information for other data source types.

Connection strings for various data source types normally have common attributes between the different data source types. For instance, connection strings, regardless of the data source type, identify a server where the data source is located. However, this particular attribute may not be named the same, depending on the API being used to connect to the data source. For example, the name commonly found for the server when OLEDB is being used is "Data Source." While the name commonly found for the server when ODBC is being used is "Server." Therefore, in various embodiments, keywords are used at keys in the key-pair dictionary for the common attributes across data source types so that they can be easily identified in the dictionary regardless of the data source type and API associated with a connection string being generated. For instance, returning to the example, the server may be stored using the keyword "ServerName" as the key in the dictionary.

Continuing, each of the subclasses includes a corresponding non-abstract method with the same name 131-134, 141-144, 151-154 for each abstract method 121-124 found in the AbstractConnectInfo class 120. A derived subclass is declared by using a base class, in this case the AbstractConnectInfo class 120, from which the derived subclass inherits data and behavior. Here, in various embodiments, each derived subclass 130, 140, 150 has a specific design that is isolated to a given data source type and contains the logic necessary to use the information found in the dictionary and generate a requested connection string for a given API type. In addition, each derived subclass 130, 140, 150 is responsible for interpreting key-value pairs from the dictionary and providing additional properties and/or functions necessary to support features specific to a data source type. One advantage of such a design is the subclass for a particular data source type 130, 140, 150 can be revised and/or extended to support further APIs without having to modify the AbstractConnectInfo class 120. Furthermore, subclasses for additional data source types can be added with minimal modifications.

Therefore, as discussed further herein, when an application is in need of a connection string for a particular data source type and API, the application calls the corresponding method for the API for the object instantiated for the particular data source type and in turn, the non-abstract version of the method for the API found in the corresponding derived subclass for the particular data source type is executed. For example, an application may be in need of an ODBC connection for a SQL Server database. Here, the application would set a connection string variable (e.g., connectStr) equal to the ODBC method (ToODBCConnectInfo 125) of the corresponding object (e.g., connectInfo) instantiated for the SQL Server data source type (e.g., connectStr=connectInfo.ToODBCConnectString). In turn, the ToODBCConnectInfo method 125 calls the GenerateODBCConnectString method 122 for the object and since the object was instantiated for a SQL Server data source type, the non-abstract version of the method GenerateODBCConnectString 132 in the MSSQLConnectInfo subclass 130 is executed to generate the needed string. As a result, the connection string variable connectStr is populated with the needed ODBC connection string for a SQL Server database that the application can now use to connect to the SQL Server database.

The AbstractConnectInfo class 120 also includes the AbstractConnectInfo method 126. As is discussed in further detail herein, this particular method 126 is used in various embodiments to retrieve connection information stored as metadata. Corresponding methods 135, 145, 155 can be found in each of the derived subclasses 130, 140, 150 for the different data source types.

Finally, the framework includes two enumerated types DSType 160 and ConnectMetaType 170. An enumerated type is typically used to store a value from a closed set of values. The DSType enumeration 160 stores a value identifying a data source type. In this particular instance, the value set 161 for this enumeration is Unknown, MSSQL, PostgreSQL, and Oracle. The ConnectMetaType enumeration stores a value for predefined keywords of known attributes required to establish connection strings. Here, the value set 171 for this enumeration is ServerName, Port, Username, Password, Secure, and Misc. As described in further detail herein, both of these enumerated types 160, 170 are used in various embodiments to communicate a reference data source type or to reference an attribute for a data source type.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Consumer Application

Figure 2:
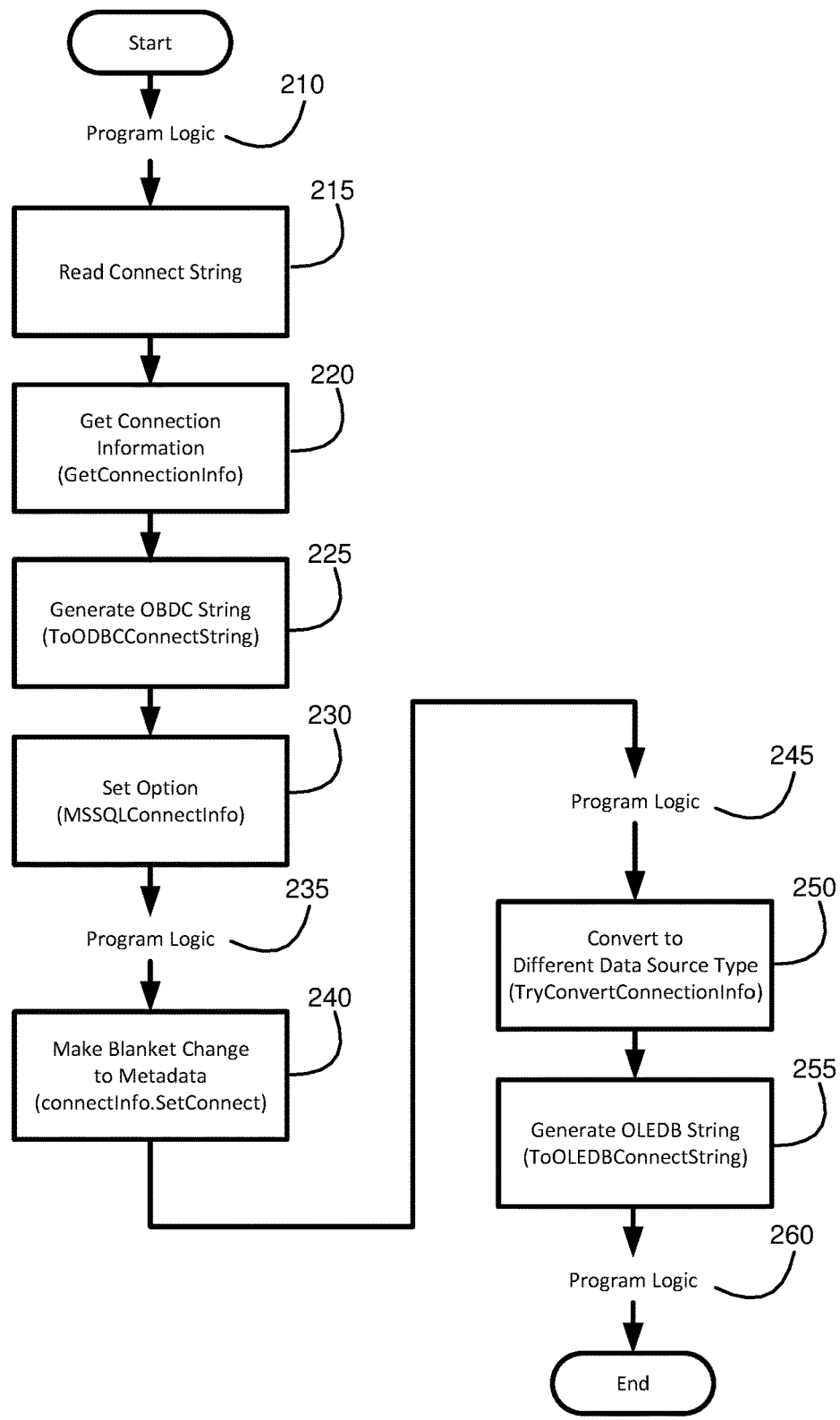
FIG. 2 illustrates a consumer application in an object-oriented programming environment making use of different connection strings for various data sources in accordance with various embodiments of the invention.

Turning now to FIG. 2, additional details are provided regarding a process flow involving the use of different connection strings concerning different data source types and different APIs. Specifically, FIG. 2 is a process flow carried out by some type of consumer application for performing such functionality according to various embodiments of the invention. For instance, in particular embodiments, the process flow shown in FIG. 2 may correspond to operations carried out by a processor in a computer processing system as it executes the consumer application stored in the component's volatile and/or nonvolatile memory.

Here, the process flow shown in FIG. 2 for the consumer application is provided to demonstrate various aspects of embodiments of the claimed invention. Specifically, the process flow shown in FIG. 2 demonstrates how a consumer application can make use of reusable components that are capable of taking existing connection strings, parsing the strings into usable metadata, and making use of the metadata to generate connection strings for various data source types that are able to support multiple APIs.

The process begins with the consumer application performing program logic in Operation 210 and encountering a connection string for a SQL Server database using OLEDB: e.g., connectStr="Provider=SQLXMLOLEDB.4.0; Data Provider=SQLNCLI11; Data Source=myServerAddress; Initial Catalog=myDataBase; User Id=myUsername; Password=myPassword." In this instance, the consumer application reads the connection string in Operation 215 and is in need of converting the connection string over to an ODBC driver.

To accomplish the conversion, the connect information found in the string (e.g., the attributes and corresponding values) must first be parsed from the string so that the information may be used in generating a new connection string for the desired API. The consumer application performs this task in various embodiments by initially calling a method to gather the connection information from the string in Operation 220. For instance, considering the framework shown in FIG. 1, the consumer application calls the GetConnectionInfo method 112 in the DSFactory class 110. Here, the GetConnectionInfo method 112 is configured for two input variables, the connection string, itself, and a hint for the data source type associated with the connection string. For example, the consumer application may call on the method as: AbstractConnectInfo connectInfo=DSFactory.GetConnectionInfo(connectStr, DSType.MSSQL). Thus, the inputs are the connection string (connectStr) and a hint (DSType.MSSQL) that the connection string is configured for a SQL Server database.

In turn, the GetConnectionInfo method 112 in particular embodiments first calls a method (e.g., DetectDSType method 111) to verify the data source type for the string. As discussed further herein, the DetectDSType method 111 performs the verification by matching the attributes found in the connection string with attributes registered for each of the different data source types. Once the data source type has been verified, the GetConnectionInfo method 112 calls the ParseConnectString method and a version of the ParseConnectString method 134, 144, 154 for the data source type (found in the corresponding data source type subclass 130, 140, 150) is executed to parse the string and save the attributes and corresponding values. As discussed further herein, the ParseConnectString method performs the parsing of the connection string in particular embodiments by parsing each attribute-value combination and saving each as a key-value pair in a key-value dictionary. As a result of this process, connectInfo now exists as an object instantiated for the particular data source type that the connection string is configured for. In addition, the data source type has been confirmed and set (e.g., as DBType.MSSQL) and the key-value dictionary has been populated based on the attributes and corresponding values found in the connection string.

Once the connection information has been obtained from the string, the consumer application can now convert the string over to an ODBC driver. Accordingly, in various embodiments, the consumer application performs the conversion by calling on a method to generate a connection string for the desired API by using the connection information extracted from the original connection string in Operation 225. Here, in various embodiments, the consumer application calls a method defined for the desired API to perform the conversion. For instance, the consumer application may call: connectStr=connectInfo.ToODBCConnectString( ).

In this instance, the connection string is set by calling the ToODBCConnectString method 125 of the connectInfo object instantiated for the data source type. In turn, the ToODBCConnectString method 125 calls the GenerateODBCConnectString method 122 of the connectInfo object. As the reader may recall, the version of the GenerateODBCConnectString method 122 found in the AbstractConnectInfo class 120 is abstract and therefore the non-abstract version of the method for the desired API found in the derived subclass for the particular data source type is executed. Here, since the data source type associated with the connectInfo object is SQL Server, then the non-abstract version of the GenerateODBCConnectString method 132 found in the MSSQLConnectInfo subclass 130 is executed to generate an ODBC connection string for the SQL Server database. For example, this string may be returned in connectStr as "Driver={SQL Server Native Client 11.0}; Server=myServerAddress; Database=myDataBase; Uid=myUsername; Pwd=myPassword."

As one can see, the original attributes found in the original connection string have been replace by the attributes required for the new API. The non-abstract version of the GenerateODBCConnectString method 132 is responsible for building the string with the required attributes and setting the values for the attributes as either default values (such as Driver={SQL Server Native Client 11.0]) or as values found in the dictionary for the connectInfo object (such as Server=myServerAddress, Database=myDataBase, Uid=myUsername, and Pwd=myPassword). However, the non-abstract version of the GenerateODBCConnectString method 132 is not required to know the API source of the original connection string to generate the connection string for the new API. Furthermore, the consumer application is not required to know which one of the derived methods needs to be executed to generate the string using the new API. All the consumer application is required to do is call the corresponding method for the desired API.

In many instances, a data source type has specific attribute options that can be set for a connection string. For example, SQL Server has support for multiple active result sets (MARS), which is a connection attribute that allows applications to have more than one pending request per connection, and in particular, to have more than one active default result set per connection. Therefore, particular embodiments of the invention allow for the consumer application to cast to a specific data source type to access specific attribute options for the type.

For instance, looking at the SQL Server MARS attribute, the consumer application may set this option and then generate a connect string accordingly with this option in Operation 230. Firstly, the consumer application casts to the specific data source type to access the type-specific options: MSSQLConnectInfo mssq1ConnectInfo=connectInfo as MSSQLConnectInfo. Accordingly, an mssq1ConnectInfo object is created for the MSSQLConnectInfo subclass 130 based on the connectInfo object. As a result, the key-pair dictionary may now include key-value pairs that are specific for a SQL Server data source type. Next, the consumer application sets the MARS attribute to enabled for the mssq1ConnectInfo object: mssq1ConnectInfo.MarsEnabled=true.

At this point, the consumer application can now generate a connection string with the MARS attribute enabled: connectStr=mssq1ConnectInfo.ToODBCConnectString( ). As a result, the consumer application can now connect to the particular SQL Server data source using the connection string as the application performs further program logic in Operation 235.

At some point, the consumer application may need to gather information from a backup SQL Server database sitting on a different server for the original SQL Server database. Therefore, the consumer application needs to connect to the backup database. Here, the consumer application may facilitate switching the connection over to the backup database on the different server by making a blanket change to the metadata found in the dictionary for the connectInfo object in Operation 240. Once the blanket change has been made, the consumer application can then generate a connection string for the backup database using any desired API for connecting to the database.

Therefore, in this example, the consumer application first makes the change to the metadata (the dictionary) by setting the ServerName to the different server in the dictionary by referencing the ConnectMetaType.ServerName enumeration 170 to identify the key-pair in the dictionary:connectInfo.SetContent(ConnectMetaType.ServerName,"MyBackUpServerAddress"). Once the change has been made to the metadata (dictionary), the consumer application can then generate a connection string for the new server: connectStr=connectInfo.ToODBCConnectString( ). Now the consumer application has generated a connection string using the same API but set to the new server. At this point, the consumer application can perform further program logic in Operation 245 using the new connection string.

Finally, the consumer application may need to connect to a different data source type altogether. For example, the consumer application may be dealing with a system that has a SQL Server database and a PostgreSQL database mirrored on the same machine. Therefore, the consumer application may need to convert over to the Postgres database using the same connection values. Here, in Operation 250, the consumer application first instantiates a new object (newconnectInfo) for a Postgres data source type by using the TryConvertConnectInfo method 113: DBFactory.TryConvertConnectionInfo(connectInfo,DBType.PostgreSQL out AbstractConnectInfo newconnectInfo). The dictionary may now contain key-value pairs that are associated with the new object based on the attributes for a PostgreSQL data source type.

At this point, the consumer application can then generate connection strings for various APIs, such as OLEDB, for the new data source type in Operation 255. For example, the consumer application may first perform some PostgreSQL specific adjustment to add a data source type-specific attribute to the dictionary: PostgreSQLConnectInfo postgreSQLConnectInfo=newconnectInfo as PostgreSQLConnectInfo and postgreSQLConnectInfo.Timeout(1000). The consumer application may then generate a connection string using OLEDB for the PostgreSQL database by using connectStr=newconnectInfo.ToOLEDBConnectString( ). As a result, the connection string "Provider=PostgreSQL OLE DB Provider; DataSource=myBackUpServerAddress; location=myDataBase; User ID=myUsername; password=myPassword; timeout=1000;" is generated.

Finally, the consumer application can continue on performing additional program logic as needed in Operation 260. Accordingly, the consumer application is able to utilize these reusable components to generate connection strings for multiple data source types that are capable of supporting multiple connection APIs as needed. Further discussion on these various reusable components are provided herein.

GetConnectionInfo Method

Figure 3:
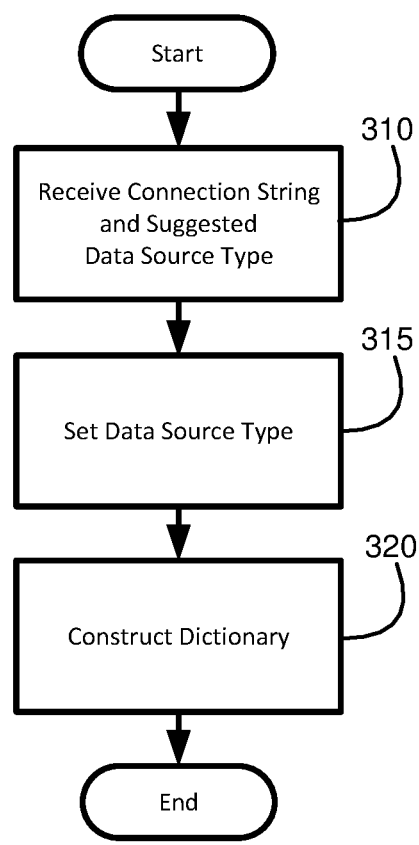
FIG. 3 illustrates a process flow for obtaining connection information for a connection string in accordance with various embodiments of the invention.

Turning now to FIG. 3, additional details are provided regarding a process flow demonstrating the functionality of the GetConnectionInfo method 112 in accordance with various embodiments of the invention. As previously discussed, the GetConnectInfo method 112 may be called by some type of consumer application to retrieve the connection information from a connection string encountered by the consumer application while performing program logic. For example, the process flow shown in FIG. 3 may correspond to operations carried out as a result of a processor in a computer processing system executing the consumer application stored in the component's volatile and/or nonvolatile memory, and the consumer application calling the GetConnectionInfo method 112 for an encountered connection string.

As the reader may recall, the GetConnectionInfo method 112 is found in the static class DSFactory 110 and is used to parse out the attributes and corresponding values from a particular connection string. In various embodiments, the method 112 receives two parameters as input, the connection string to be parsed and a suggestion (hint) as to the data source type associated with the string. Therefore, in Operation 310, the GetConnectionInfo method 112 receives the connection string and suggested data source type.

Initially, the GetConnectionInfo method 112 sets the data source type for the connection information in Operation 315. In particular embodiments, the GetConnectionInfo method 112 performs this operation by calling the DetectDSType method 111, which is also found in the static class DSFactory class 110. As discussed further herein, the DetectDSType method 111 identifies the data source type for the connection string by matching the attributes found in the string with known attributes registered by different data source types and setting the DSType enumerator value 161 to the closest matched type.

Next, the GetConnectionInfo method 112 constructs a key-value dictionary based on the attributes and corresponding values found in the connection string in Operation 320. Here, in particular embodiments, the GetConnectionInfo method 112 performs this operation by calling the ParseConnectString method 124 for an object instantiated for the data source type associated with the connection string. Therefore, when this particular method is called, the version of the method found in the corresponding derived subclass for the data source type associated with the connection string is executed.

For example, if the data source type identified for the sting is Oracle, then the version of the ParseConnectString 154 found in the OracleConnectInfo derived subclass 150 is executed to parse the connection string into its attributes and corresponding values and to place those attributes and corresponding values as key-value pairs in the dictionary. The dictionary represents metadata that can then be used in various embodiments to generate connection strings supporting different data source types and APIs.

DetectDSType Method

Figure 4:
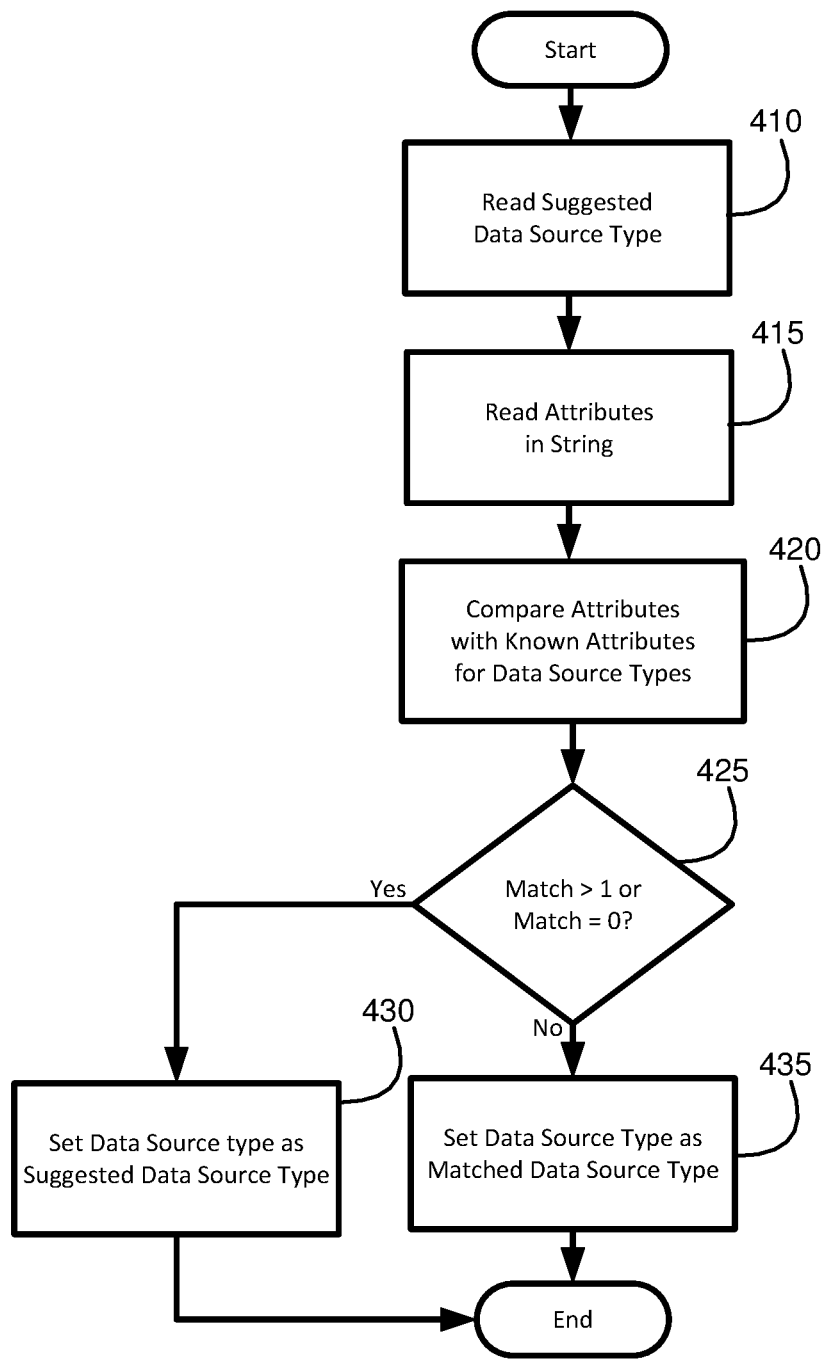
FIG. 4 illustrates a process flow of identifying a data source type for a connection string in accordance with various embodiments of the invention.

Turning now to FIG. 4, additional details are provided regarding a process flow demonstrating the functionality of the DetectDSType method 111 in accordance with various embodiments of the invention. As previously discussed, the DetectDSType method 111 may be called by the GetConnectInfo method 112 to identify a data source type associated with a connection string.

The process begins with the DetectDSType method 111 reading the suggested data source type in Operation 410. Next, the DetectDSType method 111 reads the attributes in the connection string in Operation 415 and compares them with known attributes for different data source types in Operation 420. Here, in particular embodiments, the DetectDSType method 111 uses a library of known attributes that are registered by different data source types. Thus, the DetectDSType method 111 queries this library based on the attributes read from the connection string to find matches in the library for each attribute. Accordingly, in various embodiments, the DetectDSType method 111 selects the data source type having the most matched registered attributes with the attributes found in the connection string.

The DetectDSType method 111 then determines whether the number of data source types with the most matches is greater than one or a match could not be made with any source type in Operation 425. If the determination is no, then the DetectDSType method 111 sets the data source type associated with the connection string as the matched data source type in Operation 435. However, if the determination is yes, then the DetectDSType method 111 sets the data source type associated with the connection string as the suggested data source type in Operation 430. That is to say, in various embodiments, the DetectDSType method 111 sets the data source type for the connection string depending on the number of matches found by setting the DSType enumerator value 161 to the appropriate data source type.

ParseConnectString Method

Figure 5:
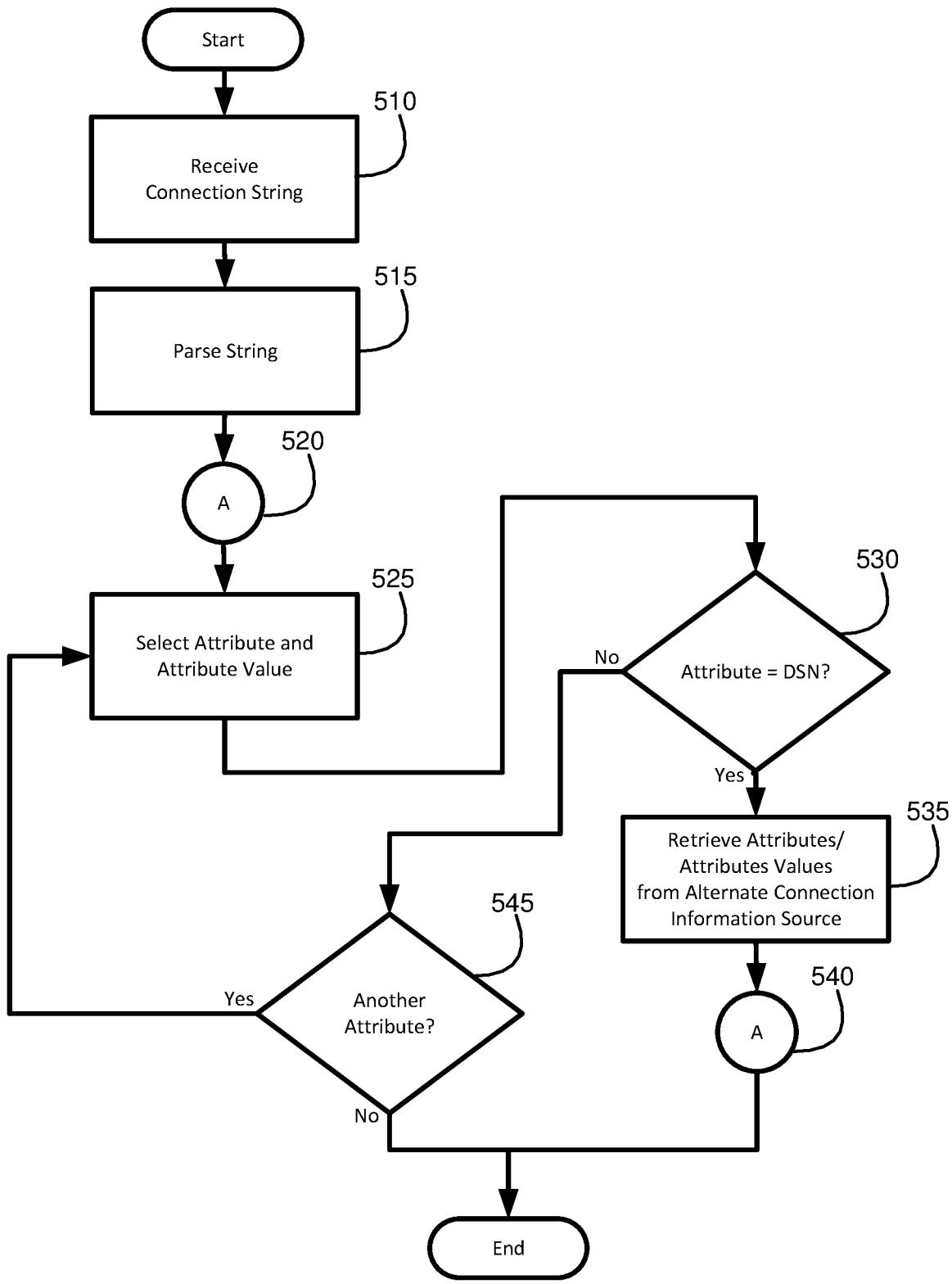
FIG. 5 illustrates a process flow for parsing a connection string in accordance with various embodiments of the invention

Turning now to FIG. 5, additional details are provided regarding a process flow demonstrating the functionality of the ParseConnectString method 124 in accordance with various embodiments of the invention. As previously discussed, the ParseConnectString method 124 may be called by the GetConnectInfo method 112 to parse a connection string and place the attributes and corresponding values found in the string as key-value pairs in a dictionary. Here, in various embodiments, the GetConnectionInfo method 112 calls the ParseConnectString method for the object for the data source type set for the connection string and as a result, the version of the method in the corresponding derived subclass for the data source type set for the connection string is executed.

Therefore, the process begins with the ParseConnectString method 134, 144, 154 receiving the connection string in Operation 510. The ParseConnectString method 134, 144, 154 then parses the string in Operation 515. Here, in particular embodiments, the ParseConnectString method 134, 144, 154 recognizes the attribute equals corresponding value pairs for the string as being separated by semi-colons and parses each pair out accordingly. At this point, the ParseConnectString method 134, 144, 154 places key-value pairs in the dictionary for the data source type set for the string based on the attributes and corresponding values parsed from the string in Operation 520. The operations carried out by the ParseConnectString method 134, 144, 154 to construct the dictionary are shown in FIG. 6.

Figure 6:
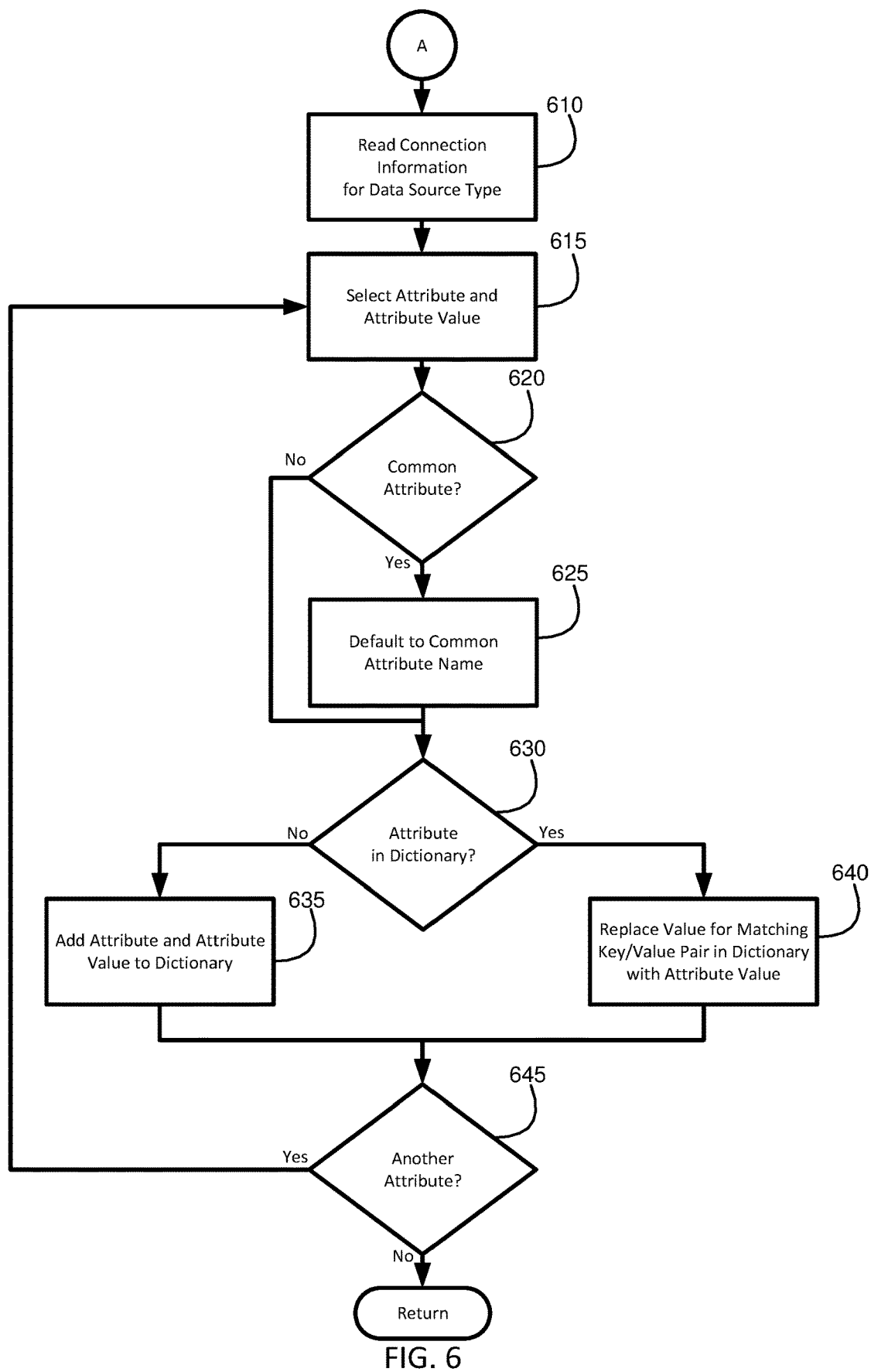
FIG. 6 illustrates a process flow for constructing a key-value pairs dictionary for a data source type in accordance with various embodiments of the invention.

Thus, turning briefly to FIG. 6, the ParseConnectString method 134, 144, 154 reads the connection information for the data source type in Operation 610. As previously mentioned, in particular embodiments, a library may be maintained that includes information on the available attributes registered by the data source type and the information may be queried from this library and returned in a collection such as, for example, a HashSet. Accordingly, this HashSet may identify which attributes from the available attributes registered by the data source type are common over the different data source types. For example, a common attribute found in many connection strings for the different data source types is user name. Therefore, the information found in the HashSet may indicate that user name attribute is a common attribute among the different data source types. However, in other embodiments, the ParseConnectString method 134, 144, 154 may be configured to recognize a common attribute based on its name. Therefore, in these particular embodiments, Operation 610 may not be necessary.

Accordingly, the ParseConnectString method 134, 144, 154 selects an attribute and corresponding value parsed from the connection string in Operation 615 and determines whether the selected attribute is a common attribute in Operation 620. If so, then the ParseConnectString method 134, 144, 154 replaces the name of the attribute with a common attribute name in Operation 625. For example, the connection string may be associated with an ODBC data source and the selected attribute may be "UID." In this example, the ParseConnectString method 134, 144, 154 may recognize "UID" is associated with the common attribute user name. Therefore, the ParseConnectString method 134, 144, 154, would replace the attribute name "UID" with "UserName."

Next, the ParseConnectString method 134, 144, 154 determines whether the attribute is already found in the dictionary in Operation 630. In particular situations, the dictionary may already be populated with one or more key-value pairs. Therefore, if a key-value pair already exists in the dictionary for the attribute parsed from the connection string, then the ParseConnectString method 134, 144, 154 replaces the value for the matching key-value pair in the dictionary with the attribute value parsed from the string in Operation 640. If a key-value pair does not exist in the dictionary for the attribute parsed from the connection string, then the ParseConnectString method 134, 144, 154 adds the attribute and corresponding value as a new key-value pair in the dictionary in Operation 635.

At that point, the ParseConnectString method 134, 144, 154 determines whether another attribute and corresponding value have been parsed from the connection string in Operation 645. If so, then the ParseConnectString method 134, 144, 154 returns to Operation 615, selects the next attribute and corresponding value parsed from the connection string, and repeats the same operations already discussed above for the newly selected attribute and value. Once the ParseConnectString method 134, 144, 154 has processed all of the attributes and corresponding values parsed from the connection string, the dictionary of key-value pairs has been populated for the data source type associated with the connection string. As discussed further herein, this dictionary may now be used in generating connection strings using various APIs to connect to the particular data source type found in the original connection string.

Note that in actually, the dictionary allows for the generation of connection strings using various APIs to connect to an actual data source that is identified as a value for one of the key-value pairs in dictionary, this data source being of the type identified for the string. However, the data source value may be changed in particular embodiments to generate connections string using various APIs to connect to a different data source of the same type.

In various embodiments, the ParseConnectString method 134, 144, 154 may perform further operations to determine whether other modes of connection are being used to connect to the data source found in the connection string. For instance, a consumer application may be using a data source name ("DSN") to request a connection to a particular ODBC data source. A DSN is a symbolic name that represents an ODBC connection and stores connection details such as database name, directory, database driver, username, and password when making a connection the ODBC.

Accordingly, a DSN may be used for various ODBC source types. For instance, a system DSN can be used throughout a system and is created on the machine where an application accessing the data source is located. Here, a system DSN's connection information is typically stored in the registry. While a user DSN is created for a specific user. Typically, only the user who created the DSN can see and use it. Like a system DSN, a user DSN's connection information is also typically stored in the registry. Finally, a file DSN is a DSN with its connection information stored in a text file normally with a .DSN extension. A file DSN is typically stored by default in a particular file location (folder). Accordingly, connection information for these particular modes of connection are found outside of the connection string, itself, encountered by consumer application and therefore, the ParseConnectString method 134, 144, 154 is configured in various embodiments to access this connection information to identify further attributes and corresponding values to add as key-value pairs to the dictionary.

Therefore, returning to FIG. 5, the ParseConnectString method 134, 144, 154 selects an attribute found in the connection string in Operation 525. Once selected, the ParseConnectString method 134, 144, 154 determines whether the attribute references a DSN in Operation 530. For example, the parameter may be "DSN" for a system DSN or "FILEDSN" for a file DSN. If so, then the ParseConnectString method 134, 144, 154 retrieves the additional attributes and corresponding values from the alternate connection information source in Operation 535. At this point, the ParseConnectString method 134, 144, 154 saves the retrieved attributes and corresponding values in the dictionary in Operation 540. That is to say, in various embodiments, the ParseConnectString method 134, 144, 154 performs the operations already discussed in FIG. 6.

However, if the attribute does not reference a DSN, then the ParseConnectString method 134, 144, 154 selects the next attribute found in the connection string in Operation 545. Once the ParseConnectString method 134, 144, 154 has evaluated all of the attributes for the connection string (or a particular attribute has been found to reference a DSN and the corresponding connection information has been handled), the process ends. Accordingly, as mentioned, the dictionary may now be used in generating connection strings using other APIs to connect to data source types found in the original connection string To[Technology]ConnectString Method and Generate[Technology]ConnectString Method As previously discussed, the To[Technology] ConnectString method may be called by the GetConnectInfo method 112 to generate a connection string utilizing a desired API. Here, in various embodiments, a string variable is set equal to an object instantiated for a particular data source type and the corresponding To[Technology] ConnectString method for the object is called. In turn, the corresponding Generate[Technology]ConnectString method is called, resulting in the version of the method 131-133, 141-143, 151-153 in the corresponding derived subclass 130, 140, 150 for the particular data source type associated with the object being executed.

Figure 7:
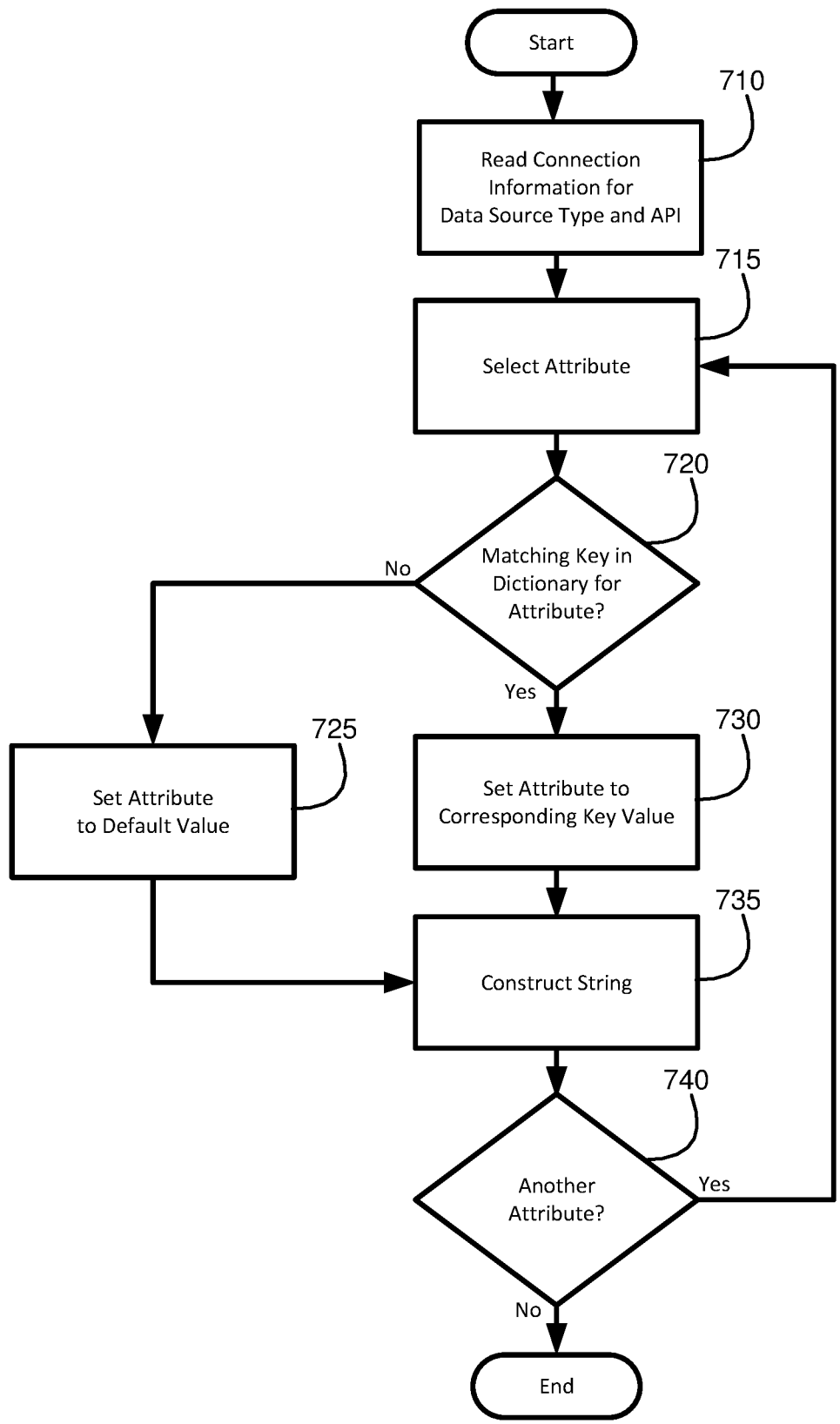
FIG. 7 illustrates a process flow for generating a connection string using a particular API in accordance with various embodiments of the invention.

Therefore, turning now to FIG. 7, additional details are provided regarding a process flow demonstrating the functionality of the Generate[Technology]ConnectString method 131-133, 141-143, 151-153 in accordance with various embodiments of the invention. The process begins with the Generate[Technology]ConnectString method 131-133, 141-143, 151-153 reading the connection information for the data source type and desired API in Operation 710. As previously mentioned, in particular embodiments, a library may be maintained that includes information on the available attributes registered by the data source type for the different APIs. This information may indicate which of the attributes are required for a particular API to be used in a connection string (as well as which of the attributes are common across the different data source types).

Accordingly, the Generate[Technology]ConnectString method 131-133, 141-143, 151-153 selects the first attribute required in the connection string in Operation 715. The Generate[Technology]ConnectString method 131-133, 141-143, 151-153 then determines whether the dictionary contains a matching key for the attribute in Operation 720. In particular embodiments, the Generate[Technology] ConnectString method 131-133, 141-143, 151-153 performs this operation by first determining whether the attribute is a common attribute across the different data source types. If so, then the Generate[Technology]ConnectString method 131-133, 141-143, 151-153 refers to the appropriate term (e.g., the appropriate ConnectMetaType enumerator keyword) to identify the corresponding key, if any, in the dictionary.

For example, the data source type for the connection string may be SQL Server and the Generate[Technology] ConnectString method 131-133, 141-143, 151-153 may have selected the attribute "Data Source." Here, the Generate[Technology]ConnectString method may recognize that this attribute is a common attribute across the different data source types referring to the server on which a data source is located. Therefore, the Generate[Technology]Connect- String method would look for the keyword "ServerName" in the dictionary to identify the corresponding key in the dictionary.

If a match is found, then the Generate[Technology]ConnectString method 131-133, 141-143, 151-153 sets the value for the attribute to the corresponding key value from the dictionary in Operation 730. However, if a match is not found, then the Generate[Technology]ConnectString method 131-133, 141-143, 151-153 sets the value for the attribute to a default value in Operation 725. The Generate [Technology]ConnectString method 131-133, 141-143, 151-153 then constructs the string by adding the attribute and value to the string in Operation 735.

At this point, the Generate[Technology]ConnectString method 131-133, 141-143, 151-153 determines whether another attribute is to be added to the string in Operation 740. If so, then the Generate[Technology]ConnectString method 131-133, 141-143, 151-153 returns to Operation 715, selects the next attribute, and repeats the operations just discussed for the newly selected attribute. Once all the required attributes have been placed in the string, the process ends. At this point, a connection string has been created for connecting to the data source type associated with the object using the identified API.

TryConvertConnectionInfo Method

Figure 8:
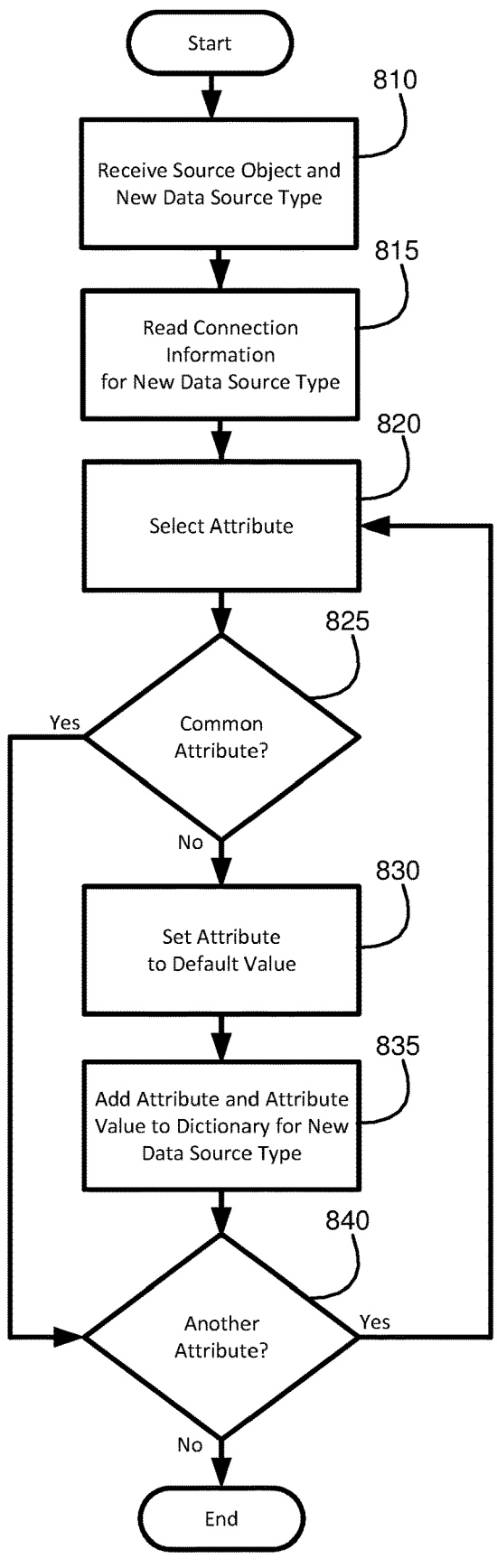
FIG. 8 illustrates a process flow for converting a connection string from a first data source type to a second data source type in accordance with various embodiments of the invention.

Turning now to FIG. 8, additional details are provided regarding a process flow demonstrating the functionality for the TryConvertConnectionInfo method 113 in accordance with various embodiments of the invention. As previously discussed, the TryConvertConnectionInfo method 113 may be called by some type of consumer application to convert the connection information for a first data source type over to a second, different data source type. For example, the process flow shown in FIG. 8 may correspond to operations carried as a result of a processor in a computer processing system executing the consumer application stored in the component's volatile and/or nonvolatile memory, and the consumer application calling the TryConvertConnectionInfo method 113 to convert connection information gathered from an encountered connection string for a first data source type (e.g., SQL Server) over to a second, different data source type (e.g., Postgres).

Here, the TryConvertConnectInfo method 113 receives two input parameters, a source object for the first data source type to be converted and the new data source type. Therefore, the process begins with the TryConvertConnectInfo method 113 receiving the source object and new data source type in Operation 810.

Next, the TryConvertConnectInfo method 113 reads the connection information for the new data source type in Operation 815. As previously discussed, in particular embodiments, a library may be maintained that includes information on the available attributes registered by the new data source type from which the TryConvertConnectInfo method 113 may gather the attributes needed to include in the value-pair dictionary for the data source type. Again, the connection information may identify which attributes are common over the different data source types or the TryConvertConnectInfo method 113 may be configured to recognize a common attribute based on its name.

The TryConvertConnectInfo method 113 then selects the first attribute needed to include in the dictionary in Operation 820. At this point, the TryConvertConnectInfo method 113 determines whether the selected attribute is a common attribute among the different data source types in Operation 825. If so, then a key-value pair already exists in the dictionary for the attribute. However, if the selected attribute is not a common attribute, then the TryConvertConnectInfo method 113 sets the value for the attribute to a default value in Operation 830. The TryConvertConnectInfo method 113 then adds the attribute and corresponding value as a key-value pair to the dictionary for the new data source type in Operation 835.

At this point, the TryConvertConnectInfo method 113 determines whether another attribute exists for the new data source type in Operation 845. If so, then TryConvertConnectInfo method 113 returns to Operation 820, selects the next attribute, and repeats the operations just discussed for the newly selected attribute. Once all the required attributes and corresponding values have been placed in the dictionary for the new data source type, the process ends.

As a result of this process, a new object has been created for the new data source type and the dictionary has been populated with key-value pairs for the required attributes and corresponding values needed to generate a connection string to connect to a data source for the data source type. In addition, the common attributes and corresponding values for both the data source type associated with the source object and the new data source type are stored in the dictionary under their common keyword names.

For instance, in particular embodiments, the dictionary would have a single key-value pair for the server name under the comment keyword name (ServerName) for both the source object and the new source object. Therefore, if a connection string were to be generated using the values of the keys stored in the dictionary for the new data source type, then the data source for the new data source type would need to be sitting on the same server as the data source for source object for the connection string to be valid. However, with that said, the values stored in the dictionary may be updated/replaced to reflect a different data source with different attributes. Furthermore, additional key-value pairs can be added to the dictionary for the new data source type for additional attributes to be added to a connection string generated for the data source type.

Startup of the DSFactory Class

In various embodiments, on startup, the DSFactory class 110 is configured to automatically load any objects of type Abstract for corresponding data source types with files found in its executing directory. This allows for existing deployments to extend and/or modify support for data source types without having to recompile the underlying application(s). In addition, this allows for providing custom replacements to existing data source types or adding additional support for new data source types.

Figure 9:
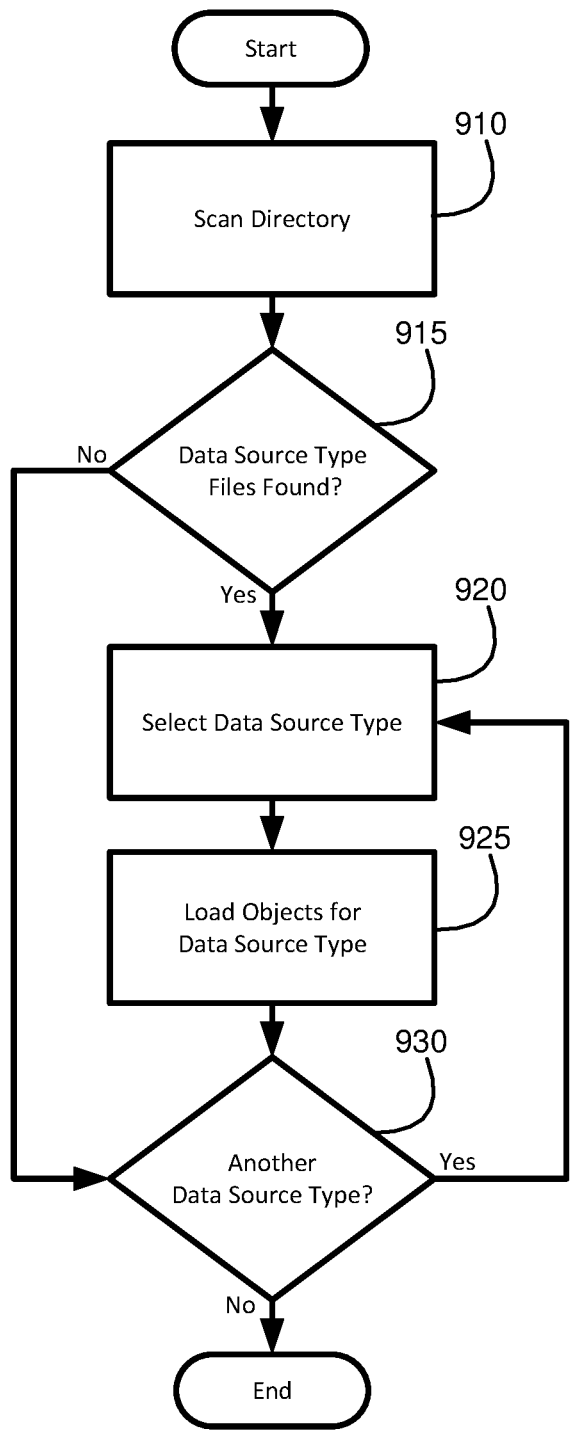
FIG. 9 illustrates a process flow for startup in accordance with various embodiments of the invention.

Therefore, turning now to FIG. 9, additional details are provided regarding a process flow demonstrating the functionality of the DSFactory class 110 on startup in accordance with various embodiments of the invention. Here, the process begins with the DSFactory class 110 scanning its executing directory for any data source type files (e.g., any files whose names begin with "dbsource_" where convention expects dbsource_<databasetypeid>) in Operation 910 and determining whether any such files were found in Operation 915.

If files were found, then the DSFactory class 110 selects a particular data source type in Operation 920 and loads the objects for the data source type in 925. At this point, the DSFactory class 110 determines whether files for another data source type were found in Operation 930. If so, then the DSFactory class 110 returns to Operation 920, selects the next data source type, and loads the objects for the newly selected data source type in Operation 925. The DSFactory class 110 repeats these operations until the objects for all of the data source types have been loaded.

Exemplary Computer Processing System

Figure 10:
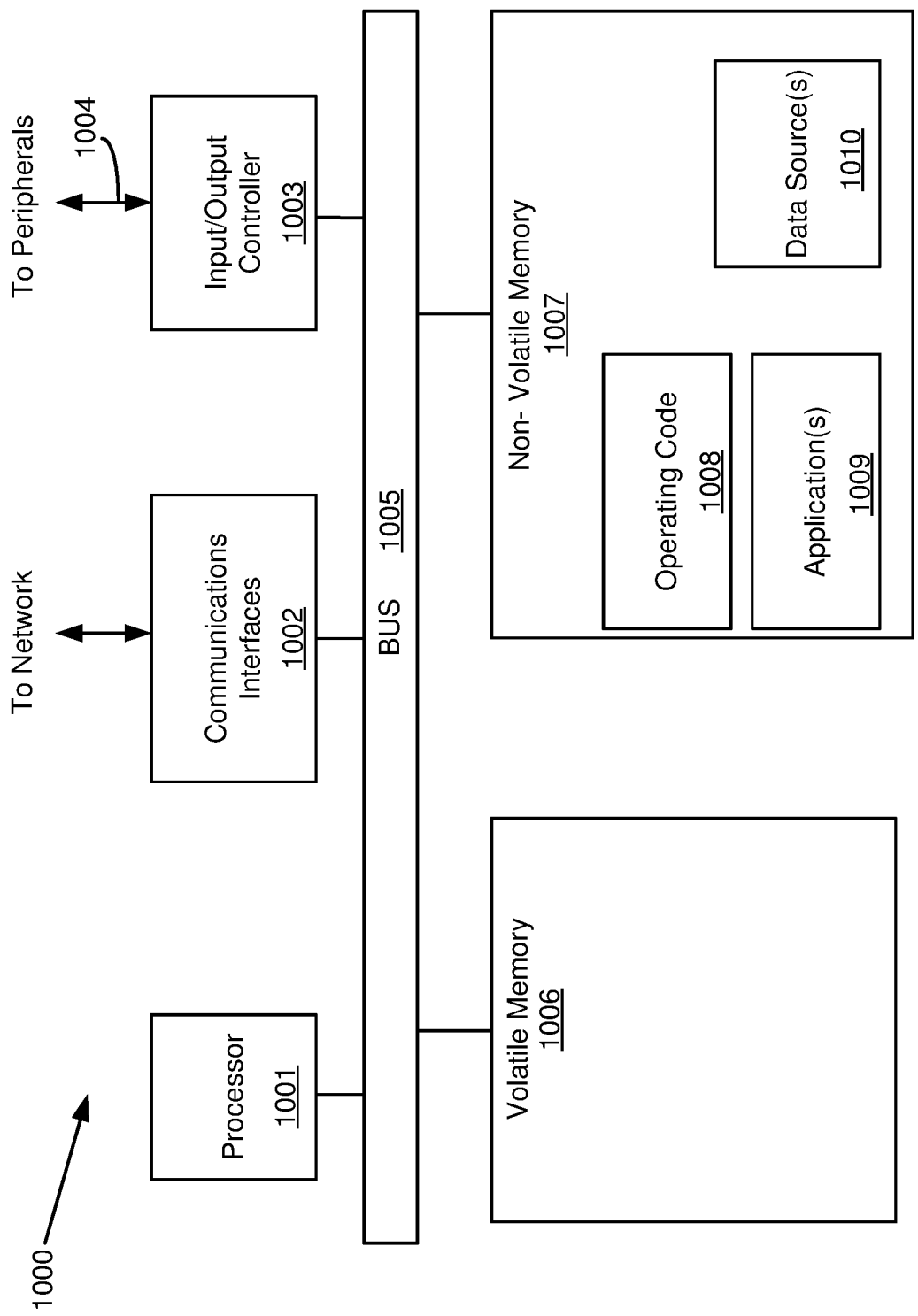
FIG. 10 illustrates an embodiment of a processing device for practicing various technologies and concepts disclosed herein.

FIG. 10 is an exemplary schematic diagram of a computer processing system that may be used in embodiments of various architectures to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1002 for communicating data via a network with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1003 may also communicate with one or more input devices or peripherals using an interface such as, but not limited to: a keyboard, a mouse, a touch screen/display input, microphone, pointing device, etc. The input/output controller 1003 may also communicate with output devices or peripherals, such as displays, printers, speakers, headsets, banner displays, etc.

The processor 1001 may be configured to execute instructions stored in volatile memory 1006, non-volatile memory 1007, or other forms of computer readable storage media accessible to the processor 1001. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1007 may store program code and data, which also may be loaded into the volatile memory 1006 at execution time. For example, the non-volatile memory 1007 may store one or more applications 1009 that may perform program logic involving connecting to different data source types using various connection APIs and/or operating system code 1008 containing instructions for performing the process and/or functions associated with the technologies disclosed herein. Further, the application(s) 1009 may make use of the various technologies disclosed herein to connect to and access various data source(s) 1011 found within the non-volatile memory 1007, as well as found on other storage locations. The volatile memory 1006 and/or non-volatile memory 1007 may be used to store other information including, but not limited to: records, applications, programs, scripts, source code, object code, byte code, compiled code, interpreted code, machine code, executable instructions, or the like. These may be executed or processed by, for example, the processor 1010 and may form a part of, or may interact with, the application(s) 1009.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for converting a first connection string configured to use a first application programming interface (API) to connect to a data source of a first data source type to a second connection string configured to use a second, different API to connect to the data source of the first data source type comprising:
   parsing the first connection string into connection information used by the first API to connect to the data source;
   storing the connection information into a key-value dictionary;
   identifying the first data source type is associated with the first connection string based on the connection information;
   in response to identifying the first data source type, instantiating an object for a derived subclass designed for the first data source type, the derived subclass inheriting from a base class comprising an abstract version of a method defined for the second, different API and the derived subclass comprising a non-abstract version of the method defined for the second, different API; and generating the second connection string by calling the method associated with the object, wherein the non-abstract version of the method in the derived subclass is executed as a result of calling the method and the non-abstract version of the method is configured to use at least a portion of the connection information stored in the key-value dictionary to generate the second connection string configured to use the second, different API to connect to the data source of the first data source type.

2. The method of claim 1, wherein the connection information comprises one or more attributes and corresponding values that are stored as key-value pairs in the key-value dictionary and identifying the first data source type is performed by matching at least one of the one or more attributes with attributes registered with the first data source type that are used by the second, different API to connect to data sources of the first data source type.

3. The method of claim 2, wherein the non-abstract version of the method uses the portion of the connection information to generate the second connection string by (1) matching a key portion of a key-value pair stored in the key-value dictionary with an attribute registered by the first data source type and used by the second, different API to connect to data sources of the first data source type and (2) including the attribute registered by the first data source type along with the value portion of the key-value pair stored in the key-value dictionary in the second connection string.

4. The method of claim 2 further comprising:
setting a corresponding value for a particular key-value pair identifying the data source to a new data source of the first data source type; and
generating a third connection string by calling the method associated with the second object, wherein the non-abstract version of the method in the derived subclass is executed as a result of calling the method and the non-abstract version of the method is configured to use at least a portion of the connection information stored in the key-value dictionary that includes the particular key-value pair with the corresponding value set to the new data source to generate the third connection string configured to use the second, different API to connect to the new data source of the first data source type.

5. The method of claim 1 further comprising:
converting the object for the derived subclass designed for the first data source type to a second object specific to the first data source type;
setting a corresponding value for a particular attribute registered by the first data source type and used by the second, different API to connect to data sources of the first data source type; and
generating a third connection string by calling the method associated with the second object, wherein the non-abstract version of the method in the derived subclass is executed as a result of calling the method and the non-abstract version of the method is configured to use at least a portion of the connection information stored in the key-value dictionary along with the particular attribute and corresponding value to generate the third connection string configured to use the second, different API to connect to the data source of the first data source type.

6. The method of claim 1, wherein the base class comprises an abstract version of a second method defined for a third API different from the first and second APIs and the derived subclass designed for the first data source type comprises a non-abstract version of the second method defined for the third API, and the method further comprises generating a third connection string configured to use the third API to connect to the data source of the first data source type by calling the second method associated with the object, wherein the non-abstract version of the second method in the derived subclass is executed as a result of calling the second method and the non-abstract version of the second method is configured to use at least a portion of the connection information stored in the key-value dictionary to generate the third connection string configured to use the third API to connect to the data source of the first data source type.

7. The method of claim 1 further comprising:
instantiating a second object for a second derived subclass designed for a second data source type, the second derived subclass inheriting from the base class and comprising a second non-abstract version of the method defined for the second, different API; and
generating a third connection string by calling the method associated with the second object, wherein the second non-abstract version of the method in the second derived subclass is executed as a result of calling the method and the second non-abstract version of the method is configured to use at least a portion of the connection information stored in the key-value dictionary to generate the third connection string configured to use the second, different API to connect to a data source of the second data source type.

8. A non-transitory, computer-readable medium comprising computer-executable instructions for converting a first connection string configured to use a first application programming interface (API) to connect to a data source of a first data source type to a second connection string configured to use a second, different API to connect to the data source of the first data source type that when executed by at least one computer processor are configured to cause the at least one computer processor to:
parse the first connection string into connection information used by the first API to connect to the data source;
store the connection information into a key-value dictionary;
identify the first data source type is associated with the first connection string based on the connection information;
in response to identifying the first data source type, instantiate an object for a derived subclass designed for the first data source type, the derived subclass inheriting from a base class comprising an abstract version of a method defined for the second, different API and the derived subclass comprising a non-abstract version of the method defined for the second, different API; and
generate the second connection string by calling the method associated with the object, wherein the non-abstract version of the method in the derived subclass is executed as a result of calling the method and the non-abstract version of the method is configured to use at least a portion of the connection information stored in the key-value dictionary to generate the second connection string configured to use the second, different API to connect to the data source of the first data source type.

9. The non-transitory, computer-readable medium of claim 8, wherein the connection information comprises one or more attributes and corresponding values that are stored as key-value pairs in the key-value dictionary and the computer-executable instructions are configured to cause the at least one computer processor to identify the first data source type by matching at least one of the one or more attributes with attributes registered with the first data source type that are used by the second, different API to connect to data sources of the first data source type.

10. The non-transitory, computer-readable medium of claim 9, wherein the non-abstract version of the method uses the portion of the connection information to generate the second connection string by (1) matching a key portion of a key-value pair stored in the key-value dictionary with an attribute registered by the first data source type and used by the second, different API to connect to data sources of the first data source type and (2) including the attribute registered by the first data source type along with the value portion of the key-value pair stored in the key-value dictionary in the second connection string.

11. The non-transitory, computer-readable medium of claim 9, wherein the computer-executable instructions are configured to cause the at least one computer processor to:
set a corresponding value for a particular key-value pair identifying the data source to a new data source of the first data source type; and
generate a third connection string by calling the method associated with the second object, wherein the non-abstract version of the method in the derived subclass is executed as a result of calling the method and the non-abstract version of the method is configured to use at least a portion of the connection information stored in the key-value dictionary that includes the particular key-value pair with the corresponding value set to the new data source to generate the third connection string configured to use the second, different API to connect to the new data source of the first data source type.

12. The non-transitory, computer-readable medium of claim 8, wherein the computer-executable instructions are configured to cause the at least one computer processor to:
convert the object for the derived subclass designed for the first data source type to a second object specific to the first data source type;
set a corresponding value for a particular attribute registered by the first data source type and used by the second, different API to connect to data sources of the first data source type; and
generate a third connection string by calling the method associated with the second object, wherein the non-abstract version of the method in the derived subclass is executed as a result of calling the method and the non-abstract version of the method is configured to use at least the portion of the connection information stored in the key-value dictionary along with the particular attribute and corresponding value to generate the third connection string configured to use the second, different API to connect to the data source of the first data source type.

13. The non-transitory, computer-readable medium of claim 8 wherein the base class comprises an abstract version of a second method defined for a third API different from the first and second APIs and the derived subclass designed for the first data source type comprises a non-abstract version of the second method defined for the third API, and the computer-executable instructions are configured to cause the at least one computer processor to generate a third connection string configured to use the third API to connect to the data source of the first data source type by calling the second method associated with the object, wherein the non-abstract version of the second method in the derived subclass is executed as a result of calling the second method and the non-abstract version of the second method is configured to use at least a portion of the connection information stored in the key-value dictionary to generate the third connection string configured to use the third API to connect to the data source of the first data source type.

14. The non-transitory, computer-readable medium of claim 8, wherein the computer-executable instructions are configured to cause the at least one computer processor to:
instantiate a second object for a second derived subclass designed for a second data source type, the second derived subclass inheriting from the base class and comprising a second non-abstract version of the method defined for the second, different API; and
generate a third connection string by calling the method associated with the second object, wherein the second non-abstract version of the method in the second derived subclass is executed as a result of calling the method and the second non-abstract version of the method is configured to use at least a portion of the connection information stored in the key-value dictionary to generate the third connection string configured to use the second, different API to connect to a data source of the second data source type.

15. A system for converting a first connection string configured to use a first application programming interface (API) to connect to a data source of a first data source type to a second connection string configured to use a second, different API to connect to the data source of the first data source type, the system comprising:
at least one computer processor configured to:
parse the first connection string into connection information used by the first API to connect to the data source;
store the connection information into a key-value dictionary;
identify the first data source type is associated with the first connection string based on the connection information;
in response to identifying the first data source type, instantiate an object for a derived subclass designed for the first data source type, the derived subclass inheriting from a base class comprising an abstract version of a method defined for the second, different API and the derived subclass comprising a non-abstract version of the method defined for the second, different API; and
generate the second connection string by calling the method associated with the object, wherein the non-abstract version of the method in the derived subclass is executed as a result of calling the method and the non-abstract version of the method is configured to use at least a portion of the connection information stored in the key-value dictionary to generate the second connection string configured to use the second, different API to connect to the data source of the first data source type.

16. The system of claim 15, wherein the connection information comprises one or more attributes and corresponding values that are stored as key-value pairs in the key-value dictionary and the at least one computer processor is configured to identify the first data source type by matching at least one of the one or more attributes with attributes registered with the first data source type that are used by the second, different API to connect to data sources of the first data source type.

17. The system of claim 16, wherein the non-abstract version of the method uses the portion of the connection information to generate the second connection string by (1) matching a key portion of a key-value pair stored in the key-value dictionary with an attribute registered by the first data source type and used by the second, different API to connect to data sources of the first data source type and (2) including the attribute registered by the first data source type along with the value portion of the key-value pair stored in the key-value dictionary in the second connection string.

18. The system of claim 16, wherein the at least one computer processor is configured to:
  set a corresponding value for a particular key-value pair identifying the data source to a new data source of the first data source type; and
  generate a third connection string by calling the method associated with the second object, wherein the non-abstract version of the method in the derived subclass is executed as a result of calling the method and the non-abstract version of the method is configured to use at least a portion of the connection information stored in the key-value dictionary that includes the particular key-value pair with the corresponding value set to the new data source to generate the third connection string configured to use the second, different API to connect to the new data source of the first data source type.

19. The system of claim 15, wherein the at least one computer processor is configured to:
  convert the object for the derived subclass designed for the first data source type to a second object specific to the first data source type;
  set a corresponding value for a particular attribute registered by the first data source type and used by the second, different API to connect to data sources of the first data source type; and
  generate a third connection string by calling the method associated with the second object, wherein the non-abstract version of the method in the derived subclass is executed as a result of calling the method and the non-abstract version of the method is configured to use at least the portion of the connection information stored in the key-value dictionary along with the particular attribute and corresponding value to generate the third connection string configured to use the second, different API to connect to the data source of the first data source type.

20. The system of claim 15 wherein the base class comprises an abstract version of a second method defined for a third API different from the first and second APIs and the derived subclass designed for the first data source type comprises a non-abstract version of the second method defined for the third API, and the at least one computer processor is configured to generate a third connection string configured to use the third API to connect to the data source of the first data source type by calling the second method associated with the object, wherein the non-abstract version of the second method in the derived subclass is executed as a result of calling the second method and the non-abstract version of the second method is configured to use at least a portion of the connection information stored in the key-value dictionary to generate the third connection string configured to use the third API to connect to the data source of the first data source type.

21. The system of claim 15, wherein the at least one computer processor is configured to:
  instantiate a second object for a second derived subclass designed for a second data source type, the second derived subclass inheriting from the base class and comprising a second non-abstract version of the method defined for the second, different API; and
  generate a third connection string by calling the method associated with the second object, wherein the second non-abstract version of the method in the second derived subclass is executed as a result of calling the method and the second non-abstract version of the method is configured to use at least a portion of the connection information stored in the key-value dictionary to generate the third connection string configured to use the second, different API to connect to a data source of the second data source type.

* * * * *